United States Patent [19]
Mitchell

[11] Patent Number: 4,807,854
[45] Date of Patent: Feb. 28, 1989

[54] LEACHING SOLUTION DISTRIBUTION ARM AND CONTROL THEREFOR

[75] Inventor: Phillip Mitchell, Glens Falls, N.Y.

[73] Assignee: Kamyr, Inc., Glens Falls, N.Y.

[21] Appl. No.: 80,601

[22] Filed: Aug. 3, 1987

[51] Int. Cl.$^4$ .............................................. C22B 3/02
[52] U.S. Cl. .................... 266/168; 266/266; 75/101 R; 423/27; 422/278
[58] Field of Search ............ 266/101, 168, 266; 75/101 R; 423/27; 422/278

[56] References Cited

U.S. PATENT DOCUMENTS

| | | | |
|---|---|---|---|
| 4,071,611 | 1/1978 | Chilson | 423/658.5 |
| 4,501,721 | 2/1985 | Sherman et al. | 423/150 |
| 4,728,082 | 3/1988 | Emmett, Jr. | 266/168 |
| 4,732,608 | 3/1988 | Emmett, Jr. et al. | 266/168 |

FOREIGN PATENT DOCUMENTS 0800221  1/1981  U.S.S.R. ............................ 266/168

Primary Examiner—Robert L. Stoll
Attorney, Agent, or Firm—Nixon & Vanderhye

[57] ABSTRACT

A rotatable leaching solution distribution arm is carried on a central chamber member and disposed in a tank at an elevation above another rotatable arm also carried by the member for distribution of a washing solution into the tank. The leaching solution distribution arm has discrete conduits terminating in corresponding outlets along the arm together with flow control devices accessible externally of the tank for each conduit so that the flow from each outlet into the tank can be monitored and adjusted.

14 Claims, 3 Drawing Sheets

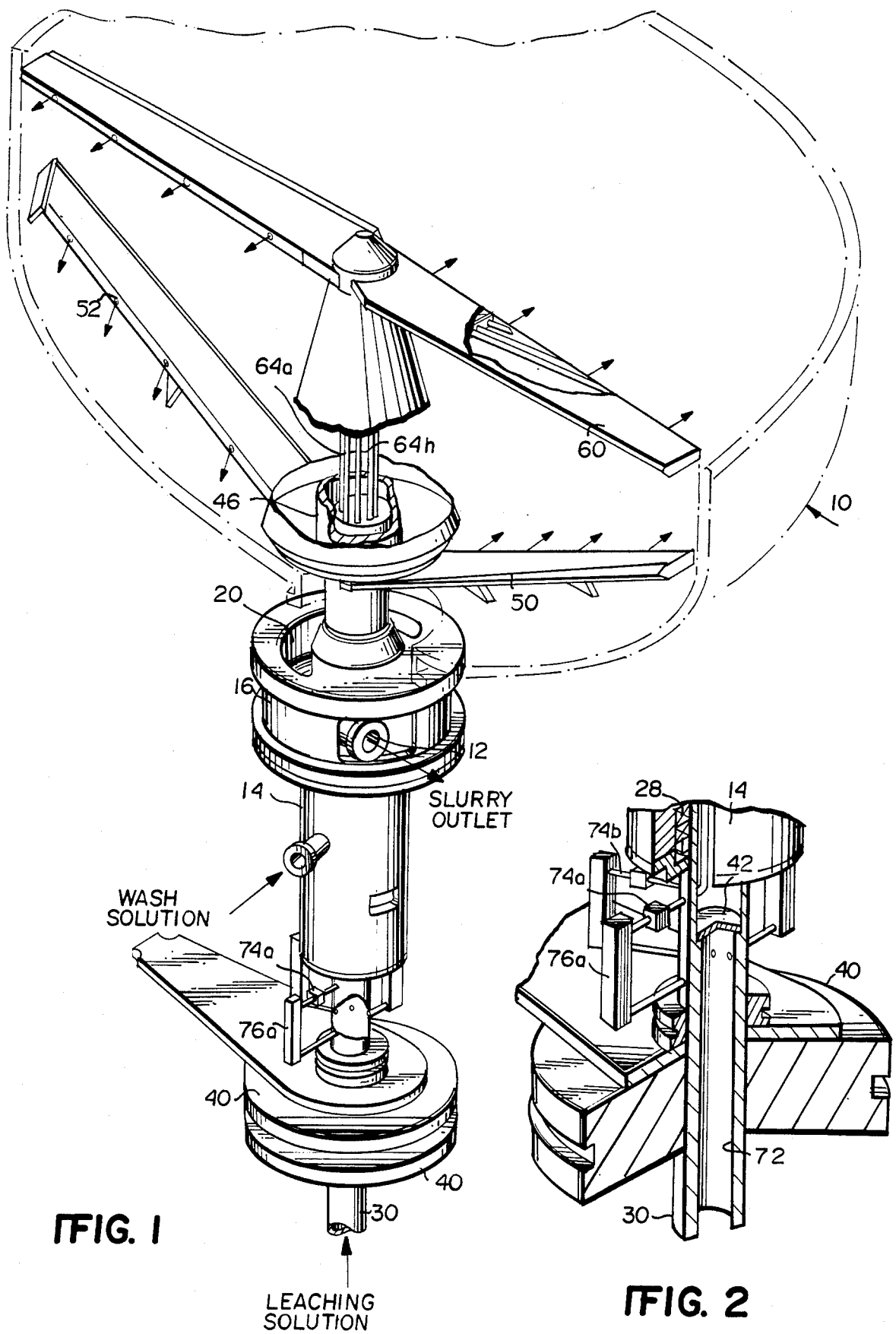

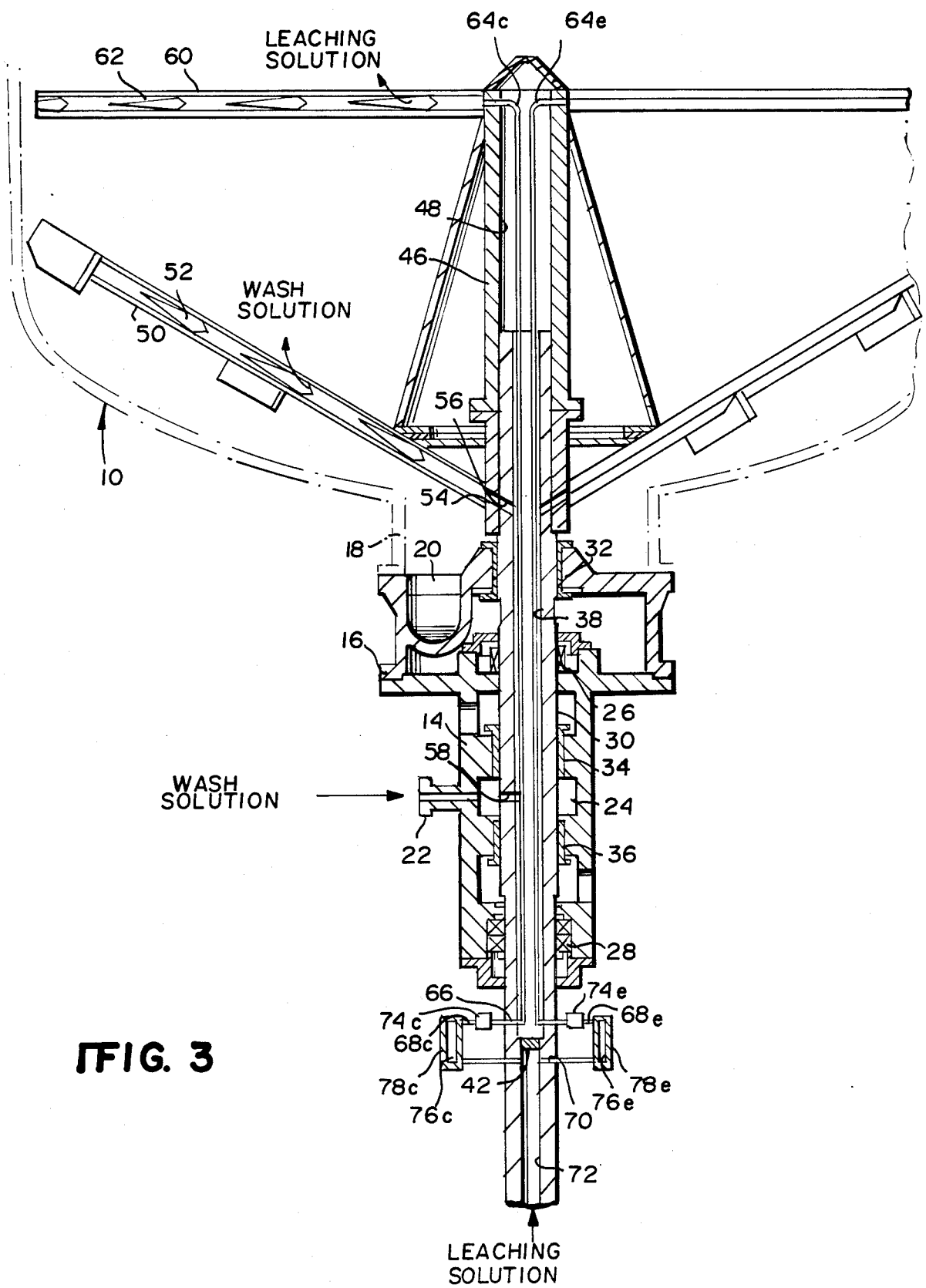

LEACHING SOLUTION DISTRIBUTION ARM AND CONTROL THEREFOR

BACKGROUND AND SUMMARY OF THE INVENTION

The present invention relates to methods and apparatus for leaching constituents from mineral materials and particularly relates to apparatus and methods for distributing leaching solution in a tank containing mineral ores as part of a continuous process for recovering valuable minerals from the ore.

Leaching systems are well known for the recovery of valuable metals from mineral ores. For example, gold or silver has been extracted from ores by leaching the ores with alkaline cyanide solution and oxygen in a continuous, as contrasted with, batch process. The mineral-containing ore is generally crushed and disposed in a slurry through which the leaching solution, i.e., a cyanide solution, is passed. The slurry is leached by using countercurrent leach and wash solutions. The pregnant leaching liquid is usually removed from the top of the tank and passed through a carbon adsorber with the valuable minerals subsequently removed from the loaded carbon material.

In using such systems, it has become increasingly important to minimize their costs. One significant area where costs can be reduced is in the quantity of leaching cyanide, e.g., solution necessary to perform the leaching process. Additionally, in prior systems, the leaching solution enters the lower end of the tank through distribution nozzles in a rotary distribution arm. However, such distribution arms and nozzles are prone to clog and plug. For example, the slurry in the tank may flow into the nozzles and plug them. This may occur upon pump failure or by centrifugal action. As will be recognized, the flow through the nozzles in a conventional distribution arm is provided through a flow conduit common to the nozzles. Thus, when the arm is still rotating, the centrifugal force on the fluid in the arm may cause some leaching fluid to flow out of the end nozzles, only to be replaced by slurry entering the centrally located nozzles. While individual check valves have been proposed in the past, these too will eventually plug. Further, distribution patterns of the leaching solution within the tank using conventional distribution arms have not been wholly satisfactory.

According to the present invention, there is provided apparatus and methods for leaching mineral ores in a continuous process to remove the valuable mineral constituents contained in the ore which reduces the quantity of leaching solution in the slurry exiting the tank and also affords improved control and distribution of the leaching solution within the tank. While the apparatus and methods according to the present invention are particularly applicable to the removal of metals, such as gold and silver, from metal-bearing ores containing such metals, they may also be adaptable to other processes, such as the removal of pyritic, organic and sulfite sulfa compounds present in a solid carbonaceous fuel of the coal or coke type.

According to one aspect of the present invention, there is provided a slurry treatment tank for containing a slurry, preferably mineral-bearing ores, such as gold or sliver ore. Discrete flow paths for the delivery of two treatment solutions into the slurry include a central member rotatable relative to the tank, together with a pair of distribution arms projecting from the central member at different elevations within the tank. Each of those arms has a plurality of outlets or nozzles spaced radially one from the other along their lengths. One of the flow paths conducts a wash solution to the lowermost arm for distribution through its outlets into the lower end of the tank containing the ore slurry. The other flow path conveys leaching solution to each of the outlets in the second distribution arm for distributing leaching solution into the slurry in the tank at an elevation above the lower arm. In this manner, a fraction of the wash solution entering through the lower arm travels upwardly through the ore slurry and carries the leaching solution added to the slurry from the top arm upwardly toward the top of the tank. The slurry exiting the tank at its top therefore contains only a slight amount of the leaching solution, i.e., cyanide, added to the tank through the elevated arm.

According to another aspect of the present invention, there is provided improved control and distribution of the leaching solution in the slurry in the tank. To accomplish this, discrete flow passages or tubes extend through the hub of the distribution arm upwardly into the arm to the respective nozzles or outlets, the latter being spaced radially one from the other along the length of the arm. Each of the discrete conduits includes a flow control valve and a flow meter for controlling the flow of leaching solution through the conduit. Each conduit also carries a check valve. Thus, the flow control valve, in conjunction with the flow meter, controls and indicates the amount of flow to each nozzle. The flow control valves may be adjusted during processing. The check valve maintains the slurry in the tank, preventing it from communicating through the discrete conduits with the source of leaching soution. These flow control devices are connected in each conduit externally of the tank and its hub whereby access for service is provided. By mounting these devices externally, the flows can be monitored and the solution distribution fine-tuned as desired.

Accordingly, it is a primary object of the present invention to provide novel and improved apparatus and methods for minimizing the quantity of the leaching solution exiting the slurry at the top of the tank as well as providing for improved control and distribution of the leaching solution in the slurry in the tank.

BRIEF DESCRIPTION OF THE DRAWINGS

FIG. 1 is a fragmentary perspective view illustrating apparatus constructed in accordance with the present invention for flowing a wash solution and a leaching solution into a leaching tank through a pair of distribution arms;

FIG. 2 is an enlarged fragmentary perspective view with parts in cross-section illustrating the conduits for flowing leaching solution into the tank and the flow control devices therefor;

FIG. 3 is a fragmentary cross-sectional view of the apparatus illustrated in FIG. 1.

DETAILED DESCRIPTION OF THE DRAWINGS

Figure 4:
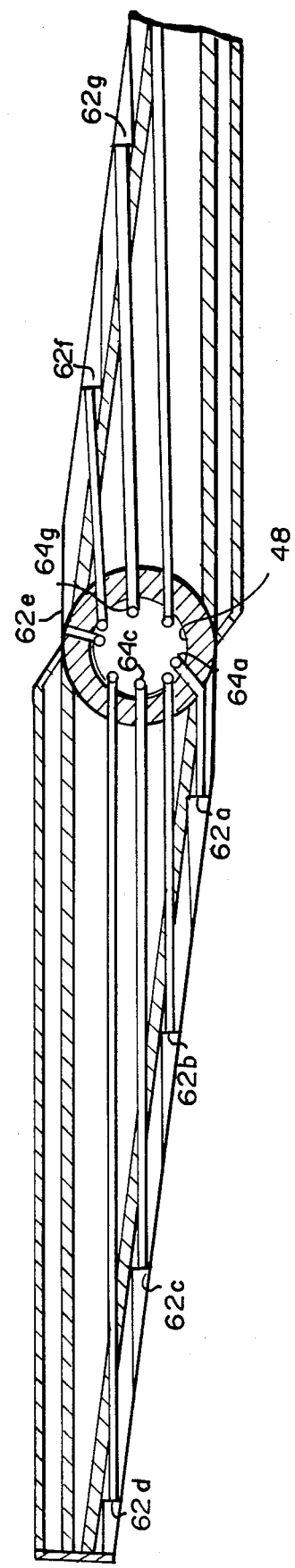
FIG. 4 is an enlarged fragmentary cross-sectional view illustrating the nozzle and distribution conduits in the upper leaching solution distribution arm.

Reference will now be made in detail to a preferred embodiment of the present invention, an example of which is illustrated in the accompanying drawings.

In FIG. 1 there is illustrated a leaching reactor vessel or tank generally designated 10. A mineral-containing ore slurry is continuously conveyed into the tank adjacent its upper end, by means not shown, for flow downwardly through the tank and through a slurry outlet indicated 12 in FIG. 1. A portion of the wash solution and the leaching solution distributed into the lower end of tank 10, by means to be described in the ensuing description, flows countercurrent to the flow of slurry in the tank. Pregnant leaching solution is withdrawn from the top of the tank for passage to a carbon adsorber and for ultimate removal of the valuable metal from the mineral ore, the latter mechanisms being disclosed in U.S. Pat. No. 4,501,721 and the patents cited therein.

Underlying tank 10 is a sleeve 14 having an enlarged collar or hub 16 disposed on its upper end which, in turn, is secured to and underlies a cylindrical outlet manifold 18 forming part of tank 10. Collar 16 has a semi-annular recess 20 formed in its upper surface which serves as an outlet for the slurry in tank 10 and which recess 20 terminates in slurry outlet 12. Sleeve 14 and collar 16 are suitably fixed in position below tank 10 and a wash solution inlet 22 is provided through a side inlet nipple in communication with an annular chamber 24 defined within sleeve 14. Sleeve 14 carries bearings 26 and 28 at its upper and lower ends, respectively, for rotatably receiving a central vertical member 30, the member 30 extending through appropriate stuffing boxes 32, 34 and 36. Central member 30 has a central passage 38 therein and extends both above collar 16 into the tank 10 and below the lower terminus of sleeve 14. Adjacent the lower end of sleeve 14 there is provided a wheel 40, which may be suitably connected to a power-operated motor-driven mechanism, for example, a hydraulic drive, not shown, for rotating member 30 within sleeve 14 and collar 16. For reasons apparent from the ensuing description, passage 38 is capped at 42 below the lower end of sleeve 14. A sleeve 46 is secured to the upper end of member 30 and defines a passageway 48 in communication with passageway 38 of member 30.

Adjacent the lower end of upper sleeve 46 is a pair of radially extending diametrically opposed arms 50 for distributing wash solution into the slurry adjacent the bottom of tank 10. The distribution arms 50 are inclined upwardly from the lower end of sleeve 46, for example at an angle of about 30°, and have a plurality of outlets for nozzles 52 spaced radially therealong for distributing the wash solution into the slurry. Apertures 54 through the lower end of sleeve 48 are disposed in registry with apertures 56 through the upper end of member 30 whereby wash solution provided through inlet 22, annular chamber 24, aperture 58 in communication with annular chamber 24, and passage 38 may be communicated to the arms and hence through nozzles 52 for distribution to the slurry in tank 10.

At the upper end of sleeve 46, there is mounted a pair of radially extending diametrically opposed arms for distributing leaching solution into tank 10 and the slurry contained therein at an elevation above arms 50 and the wash solution introduced through apertures 52. Each arm 60 carries a plurality of nozzles or outlets 62 spaced radially one from the other along an edge thereof for distribution of leaching solution to the slurry. Instead of being in open communication with the interior of the radial arms and the central passageway through member 38 and upper sleeve 48, individual conduits or tubes are provided for communicating leaching solution to the corresponding nozzle on the arms. Particularly, four nozzles are provided on each of the radial arms 60 and accordingly eight conduits or tubes 64a–64h are provided. Conduits 64a–64h extend upwardly within passage 38 of member 30 and within passage 48 of upper sleeve 46 and extend radially outwardly along each of the arms 60 as illustrated in FIG. 4, terminating in a respective nozzle or outlet 62a–62h. The lower ends of the conduits 64a–64h communicate through radial aperture 66 in member 30 terminating in conduit portions 68a–68h external to member 30. The opposite ends of conduit portions 68a–68h extend through apertures 70 for communication with the central passageway or manifold 72 in member 30 below cap 42. Manifold 72 is in communication with a reservoir of leaching solution and the leaching solution is suitably pumped, by means not shown, into manifold 72 for communication through conduit portions 68a–68h, conduits 64a–64h, and through nozzles 62a–62h for distribution into the slurry in tank 10. Check valves 74a–76h as well as throttle valves and flow meters 76a–76h and 78a–78h, respectively, are provided in the conduits 68a–68h.

In use, member 30 and consequently the wash solution distribution arms 50 and leaching solution distribution arms 60 are rotated by the hydraulic drive 40. It will be appreciated that the distribution tubes or conduits 64 and 68 rotate with member 30 and provide leaching solution from manifold 72 to the individual nozzles 62a–62h. Wash solution is provided the distribution arms 50 through inlet 22, annular chamber 24, passage 58, passageway 38 within member 30 about distribution tubes 64 for egress through the passages 56, 54 and into the distribution arms 50.

Consequently, by locating the distribution arms 60 above the wash solution arms 50, a significant savings in leaching solution, i.e., cyanide, is effected by decreasing the amount of the solution in the slurry exit in the tank at its upper end. Additionally, the flow through each distribution tube 64 may be controlled by the throttle valve 76 in conjunction with the flow meter 78 for effectively increasing or decreasing the flow rate, while the member 30 is rotating and the wash and leaching solutions are applied to the slurry. It will be appreciated that by locating the flow control devices and the check valves externally of the member 30, access thereto is readily provided for purposes of controlling the flow and/or cleaning the slurry from the distribution lines.

It will be appreciated that by the foregoing invention, there has been provided improved methods and apparatus for flow control and distribution of the leaching solution in a process for leaching mineral ore as well as conserving use of the leaching solution. While the invention has been herein shown and described in what is presently conceived to be the most practical and preferred embodiment thereof, it will be apparent to those of ordinary skill in the art that many modifications may be made thereto within the scope of the present invention, which scope is to be accorded the broadest interpretation of the appended claims so as to encompass all equivalent apparatus.

What is claimed is:

1. Apparatus for treating slurry in a tank comprising: means defining a flow path for delivery of treatment solution into the slurry in the tank including a central member rotatable relative to the tank and having a distribution arm adjacent one end for rotation with the member and distributing treatment solution into the slurry, said distribution arm having a plurality of outlets spaced radially one from the other along the length of the arm; and means defining a plurality of discrete flow passages in said member and said arm in respective communication one with the other and with respective outlets and, externally of the tank, with a source of treatment solution, said flow passage defining means including a plurality of discrete conduits, and means for individually variably controlling the flow of treatment solution through each conduit.

2. Apparatus according to claim 1 wherein said discrete conduits having portions thereof external of the tank and said member, and a check valve in each said conduit portion providing ready access thereto externally of the tank and member.

3. Apparatus according to claim 1 wherein said discrete conduits having portions thereof external of the tank and member, and a flow meter in each of said external conduit portions providing ready access thereto externally of the tank and the member.

4. Apparatus according to claim 1 wherein said member comprises a sleeve, said plurality of conduits being disposed within said sleeve and extending into said radial arm to terminate in corresponding outlets.

5. Apparatus according to claim 4 wherein each of said outlets open into the slurry in a direction generally tangent to the direction of rotation at said outlet.

6. Apparatus according to claim 1 wherein said member comprises a sleeve, a bearing assembly mounting said sleeve for rotation, said plurality of discrete conduits being disposed within said sleeve and extending into said arm to terminate in corresponding outlets, drive means for rotating said sleeve, said conduits having portions thereof external of the tank, said sleeve, said bearing means and said drive means and a check valve in each said external conduit portion providing ready access thereto externally of the tank, sleeve bearing means and drive means.

7. Apparatus according to claim 1 wherein said member comprises a sleeve, a bearing assembly mounting said sleeve for rotation, said plurality of conduits being disposd within said sleeve and extending into said radial arm to terminate in corresponding outlets, drive means for rotating said sleeve, said conduits having portions thereof external of the tank, said sleeve, said bearing means and said drive means and said control means including a control valve in each said external conduit portion accessible thereto externally of the tank, sleeve, bearing means and drive means.

8. Apparatus according to claim 1 wherein said plurality of conduits having portions thereof external of the tank and member, at least one of a check and a flow meter disposed in each said external conduit portion readily accessible thereto externally of the tank and member, and means in said member defining a central manifold for containing treatment fluid for distribution thereof to said conduit portions.

9. Apparatus for treating slurries comprising:
a tank for containing the slurry;
means defining discrete flow paths for delivery of two treatment solutions into the slurry including a central member rotatable relative to the tank and having a pair of distribution arms projecting therefrom at different elevations within said tank, said arms each having a plurality of outlets spaced radially one from the other along the length of the arm, said flow path defining means including first means carried by said member in communication with a source of one of the treatment solutions externally of said tank for providing such treatment solution individually to each of the outlets in one of said arms, and second means carried by said member in communication with a source of the other of the treatment solutions externally of said tank for providing such other treatment solution to said outlets of the other of said arms, said member comprising a sleeve having a central passage, said first communicating means including a plurality of discrete conduits in said central passage and in said one arm in communication with the respective outlets thereof and having portions thereof external of said tank and sleeve, a flow control valve in each said external conduit portion readily accessible thereto externally of said tank and said sleeve for variably controlling the flow therethrough.

10. Apparatus according to claim 9 including a check valve in each said external conduit portion readily accessible thereto externally of said tank and said sleeve.

11. Apparatus according to claim 9 wherein said member comprises a sleeve having a central passage, said first communicating means including a plurality of discrete conduits in said central passage and in said one arm and having portions thereof external of said tank and sleeve, and a flow meter in each said external conduit portion readily accessible thereto externally of said tank and said sleeve.

12. Apparatus for distributing fluid comprising:
a central hub member;
a pair of radially extending rotor arms carried by said member for rotary movement and having a plurality of outlets spaced one from the other;
means defining a plurality of discrete flow passages along each of said arms for transmitting fluid along said arms for flow through respective outlets; and
means carried by said member for providing fluid to each of said flow passages including a manifold carried by said hub member, a plurality of discrete flow passages carried by said hub member in communication with said manifold and lying in communication with respective discrete flow passages along said arms, and a flow control device in each of said flow passages carried by said hub member for variably controlling the flow of fluid through the corresponding passage carried by said member and said arm.

13. Apparatus according to claim 12 including a second pair of radially extending rotor arms carried by said member for rotary movement at an axial position along said member different than the axial position of the first mentioned pair of arms along said member and having a plurality of outlets spaced radially one from the other, means defining a flow passage through said member and along said second arms for transmitting fluid to the outlets thereof, said second pair of arms extending at an angle from said hub member toward said first pair of arms.

14. Apparatus according to claim 12 in combination with a tank, said hub member extending generally vertically into said tank, a second pair of radially extending rotor arms carried by said member for rotary movement at an elevation along said member different than the elevation of said first mentioned pair of arms along said member and having a plurality of outlets spaced radially one from the other, means defining a flow passage through said member and along said second arms for transmitting fluid therealong for flow through the outlets thereof, said second pair of arms extending at an angle from said hub member toward said first pair of arms.

* * * * *